United States Patent
Amidei (10) Patent No.: US 11,473,722 B2
(45) Date of Patent: Oct. 18, 2022

(54) MODULAR MOUNTING APPARATUS FOR ELECTRONIC DEVICE

(71) Applicant: Walmart Apollo, LLC, Bentonville, AR (US)

(72) Inventor: Anthony Amidei, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/175,945

(22) Filed: Feb. 15, 2021

(65) Prior Publication Data

US 2022/0260201 A1  Aug. 18, 2022

(51) Int. Cl.
| | |
|---|---|
| F16M 11/08 | (2006.01) |
| F16M 13/02 | (2006.01) |
| H04N 5/655 | (2006.01) |
| F16M 11/18 | (2006.01) |

(52) U.S. Cl.
CPC .......... *F16M 13/022* (2013.01); *F16M 11/08* (2013.01); *F16M 11/18* (2013.01); *H04N 5/655* (2013.01)

(58) Field of Classification Search
CPC ...... F16M 13/022; F16M 11/08; F16M 11/18; H04N 5/655
See application file for complete search history.

(56) References Cited

U.S. PATENT DOCUMENTS

| | | | | |
|---|---|---|---|---|
| 8,267,366 | B2 * | 9/2012 | Cheng | F16M 11/046 248/295.11 |
| 9,829,151 | B1 * | 11/2017 | Stenhouse | F16M 11/16 |
| D913,998 | S * | 3/2021 | Pei | D14/239 |
| 2008/0035813 | A1 * | 2/2008 | O'Keene | F16M 11/10 248/225.21 |
| 2011/0198461 | A1 * | 8/2011 | Truckor | F16M 13/02 248/205.1 |
| 2013/0206943 | A1 * | 8/2013 | Molter | F16M 13/02 248/299.1 |
| 2014/0270910 | A1 * | 9/2014 | Sculler | H04N 5/64 403/109.1 |

FOREIGN PATENT DOCUMENTS

GB  2442812 A * 4/2008 ............. F16M 11/08

OTHER PUBLICATIONS

International Search Report dated Mar. 24, 2022 in connection with PCT International Application No. PCT/US2022/016492, 2 pages.
Written Opinion dated Mar. 24, 2022 in connection with PCT International Application No. PCT/US2022/016492, 7 pages.

* cited by examiner

*Primary Examiner* — John R Schnurr (57) ABSTRACT

A mounting apparatus includes a wall bracket, a first intermediate bracket, a second intermediate bracket, a first rail, and a second rail. Each intermediate bracket affixes to the wall bracket and includes a connection mechanism to affix the intermediate bracket to the wall bracket, a first side including a first plurality of mounting screw holes, a second side including a first set of threaded fasteners, and a third side including a second set of threaded fasteners. The first rail is removably coupled to the first intermediate bracket and the second rail is removably coupled to the second intermediate bracket. Each rail includes a front segment including a second plurality of mounting screw holes, a first side segment including a first set of attachment screw holes, and a second side segment including a second set of attachment screw holes.

19 Claims, 6 Drawing Sheets

MODULAR MOUNTING APPARATUS FOR ELECTRONIC DEVICE

BACKGROUND

The present disclosure relates to a modular mounting apparatus for an electronic device. Modern day electronic devices, such as televisions and computer monitors, are designed to be able to be mounted on a wall. The electronic device is conventionally mounted to a mounting bracket or attachment that is also affixed to a wall. Mounting attachments are designed to fit an electronic device of a particular size or a range of sizes. A mounting attachment that is too small is unable to attach to the electronic device properly due to its size or, even if attachment is possible, does not possess the strength needed to hold the electronic device on the mount for an indefinite amount of time. A mounting attachment that is too large may functionally be able to mount the electronic device but is not aesthetically pleasing because the mounting attachment extends above and/or below the electronic device and is clearly visible when viewing the mounted electronic device. Further, even if the size is within the accepted range, conventional mounting attachments are not universal to fit all electronic devices due to the different configuration of mounting holes on separate electronic devices.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Some examples provide a mounting apparatus. The mounting apparatus includes a wall bracket to be affixed to a structure, first and second intermediate brackets, and first and second rails. Each intermediate bracket is affixed to the wall bracket and includes a connection mechanism to affix the intermediate bracket to the wall bracket, a first side oriented parallel to the wall bracket and including a first plurality of mounting screw holes, a second side oriented perpendicular to the first side and extending from the first side toward the wall bracket and including a first set of threaded fasteners, and a third side oriented perpendicular to the first side, parallel to the second side, and extending from the first side toward the wall bracket and including a second set of threaded fasteners. The first rail is removably coupled to the first intermediate bracket and the second rail is removably coupled to the second intermediate bracket. Each rail includes a front segment corresponding to the first side of a corresponding intermediate bracket and includes a second plurality of mounting screw holes, a first side segment corresponding to the second side of the corresponding intermediate bracket and including a first set of attachment screw holes corresponding to the first set of threaded fasteners on the second side of the corresponding intermediate bracket, and a second side segment corresponding to the third side of the corresponding intermediate bracket and parallel to the first side segment and including a second set of attachment screw holes corresponding to the second set of threaded fasteners on the third side of the corresponding intermediate bracket.

Other examples provide a mounting apparatus. The mounting apparatus includes a wall bracket to be affixed to a structure and first and second intermediate brackets. Each intermediate bracket is affixed to the wall bracket and includes a connection mechanism to affix the intermediate bracket to the wall bracket, a first side oriented parallel to the wall bracket and including a first plurality of mounting screw holes, a second side oriented perpendicular to the first side and extending from the first side toward the wall bracket and including a first set of threaded fasteners, and a third side oriented perpendicular to the first side, parallel to the second side, and extending from the first side toward the wall bracket and including a second set of threaded fasteners.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 9, the systems are illustrated as schematic drawings. The drawings may not be to scale.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Current solutions provide specific size mounts for specific sizes of electronic devices, but this leads to challenges for the consumer. When the consumer purchases a new electronic device, the previous mounting attachment is likely to be either too large (if the user purchased a new, smaller electronic device) or too small (if the user purchased a new, larger electronic device). If the previous mounting attachment is unsuitable due to being either too large or too small, the consumer is forced to purchase a new mounting attachment, uninstall the current mounting attachment, and install the new mounting attachment. The process is complicated and error prone, and the extra movement of the electronic device leads to a greater likelihood of damage to the electronic device.

These current solutions also provide challenges for the retailer. The requirement of stocking multiple sizes of a mounting attachment that are otherwise identical requires significant shelf space to keep each size in stock. The challenges to the user can reflect negatively on the retailer, leading to excessive returns and negative reviews if an incorrect size is originally purchased. Accordingly, a solution providing a modular mounting apparatus with a strength sufficient to mount electronic devices of different sizes and configurations of mounting holes is needed.

As described herein, various embodiments of the present disclosure provide a modular mounting apparatus that mounts an electronic device on a structure, such as a wall, that provides several advantages over current solutions. The modular mounting apparatus is provided with a wall bracket affixed to the structure, an intermediate bracket affixed to the wall bracket, and a rail removably coupled to the intermediate bracket. By integrating interior fasteners into the intermediate bracket that can accept threaded screws when the intermediate bracket is nested into the rail, the strength of the modular mounting apparatus is increased, enabling the modular mounting apparatus to mount electronic devices which are beyond the conventional size ranges for a mounting bracket of its size. In instances where a larger bracket is not needed, the rail can be removed by removing the screws from the integrated, interior fasteners and mounting the electronic device using the intermediate bracket, which provides sufficient strength for mounting smaller electronic devices.

Accordingly, the modular mounting apparatus described herein provides several advantages for both the consumer and the retailer. For example, the modular mounting apparatus fits a range of device sizes which presently requires multiple mounting brackets to service. In addition, a consumer can utilize the same modular mounting apparatus for different size electronic devices without removing the bracket from its mounted position, for example when upgrading to a larger electronic device. In addition, the combination of the intermediate bracket and the rail provides added strength and structural integrity to support larger electronic devices which otherwise would need a separate, larger bracket. The modularity of the modular mounting apparatus improves the aesthetics when utilized with smaller electronic devices. For example, because the larger rail is removable and the electronic device can be mounted to the intermediate bracket, the modular mounting apparatus can be modified so the modular mounting apparatus is not visible when the electronic device is mounted. In addition, the modular mounting apparatus enables a reduced cost to the consumer by allowing the consumer to purchase a single mount that works for a variety of sizes of electronic devices rather than purchasing a separate mounting bracket when an electronic device of a smaller or larger size is purchased later.

Figure 1:
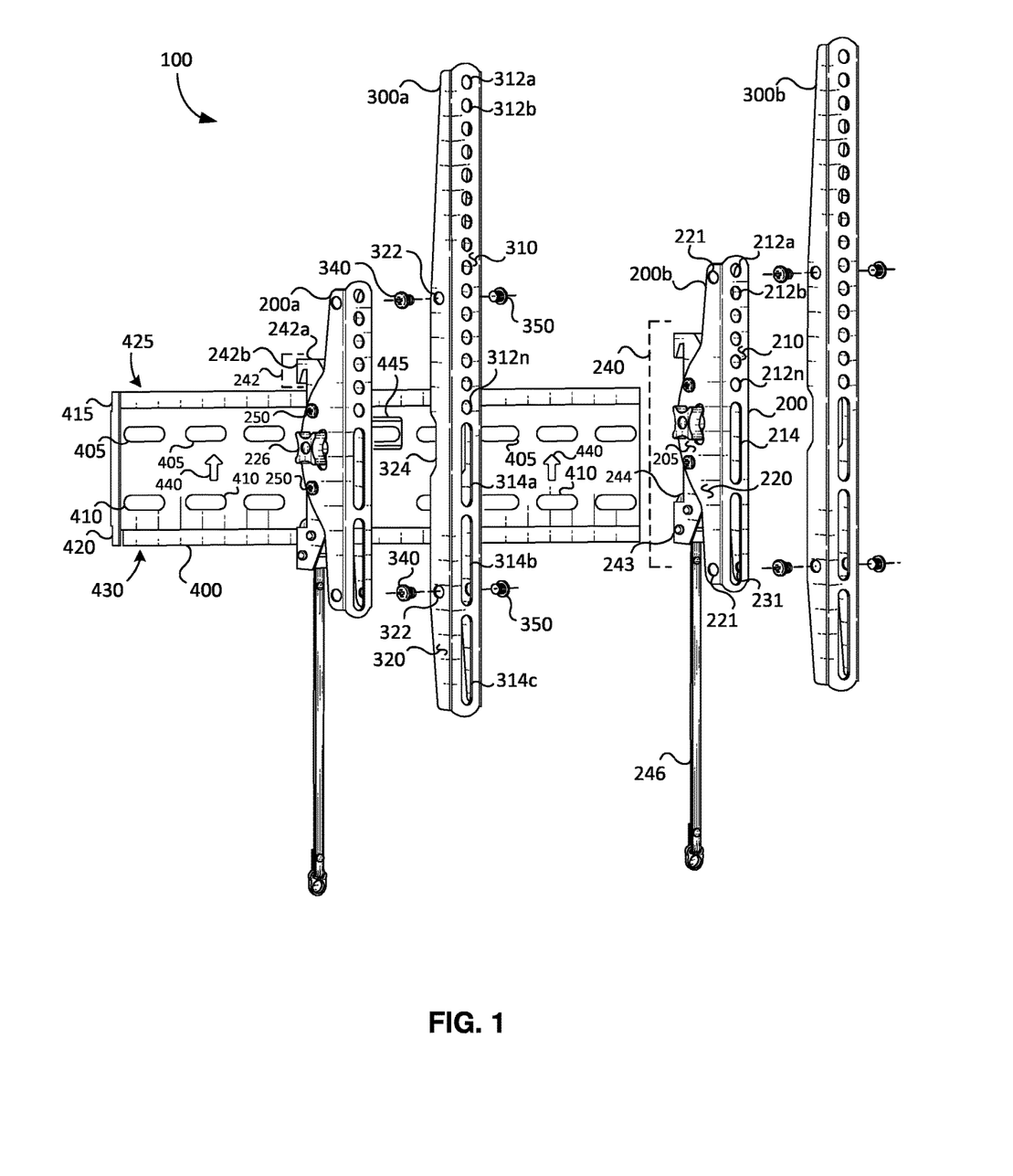
FIG. 1 illustrates an exploded view of a modular mounting apparatus according to various embodiments of the present disclosure.

FIG. 1 illustrates an exploded view of a modular mounting apparatus according to various embodiments of the present disclosure. The modular mounting apparatus 100 illustrated in FIG. 1 is for illustration only. Other examples of the modular mounting apparatus 100 can be used without departing from the scope of the present disclosure.

In some embodiments, the modular mounting apparatus 100 is a mounting bracket. As shown in FIG. 1, the modular mounting apparatus 100 includes at least one intermediate bracket, such as the two intermediate brackets 200a and 200b and further illustrated in FIGS. 2-7 as an intermediate bracket 200. Each intermediate bracket 200 includes a mounting mechanism 205 and a connection mechanism 240. The mounting mechanism 205 includes a first side 210, a second side 220, a third side 230, not visible in FIG. 1 but illustrated in FIG. 5. The first side 210 includes a first plurality of mounting screw holes 212a-212n. Each individual mounting screw hole 212 is configured to receive a screw that, after passing through the mounting screw hole 212, is threaded into a first fastener on an electronic device. The first side 210 further includes at least one elongated mounting screw opening 214. The at least one elongated mounting screw opening 214 is configured to receive a screw that, after passing through the elongated mounting screw opening 214, is threaded into a second fastener on the electronic device. The combination of the first plurality of mounting screw holes 212a-212n and the at least one elongated mounting screw opening 214 enables the intermediate bracket 200 to mount to a range of electronic devices with varying configurations of fastener patterns. By applying the at least one elongated mounting screw opening 214 on a portion of the first side 210, the first fastener and the second fastener on the electronic device do not have to line up perfectly with any two mounting screw holes 212 of the intermediate bracket 200. Instead, the first fastener is lined up with one of the mounting screw holes 212 and the second fastener can be lined up with any portion of an opening of the elongated mounting screw opening 214.

The second side 220 extends from the first side 210 toward the wall bracket 400 and is perpendicular to the first side 210. The second side 220 includes a first set of attachment screw holes 221 to receive a screw, such as the one of the screws 340. An interior face 222, not visible in FIG. 1 but shown in FIG. 3, of the second side 220 includes a first set of threaded fasteners 224, not visible in FIG. 1 but shown in FIG. 3, corresponding to the first set of attachment screw holes 221. The first side 210 further includes a knob 226 that, based on how tightly or loosely the knob 226 is turned, determines the range and ease of pivoting of the first side 210, the second side 220, and the third side 230 about the connection mechanism 240. When the knob 226 is fully tightened, the first side 210, the second side 220, and the third side 230 are locked in place about the connection mechanism 240 and prevents the intermediate bracket 200 and the rail 300 from pivoting about an axis. Loosening the knob 226 so the knob 226 is partially tightened permits the first side 210 and front segment 310 of the rail 300, the second side 220 and the first side segment 320 of the rail 300, and the third side 230 and the second side segment 330 of the rail 300 to pivot, or rotate, about the axis while the knob 226 maintains contact between the first side 210, the second side 220, and the third side 230 and the connection mechanism 240. Pivoting the first side 210, the second side 220, and the third side 230 about the connection mechanism changes the angle of the first side 210, which in turns changes the angle of the electronic device when mounted on the intermediate bracket 200. Accordingly, loosening the knob 226 allows a consumer to adjust the angle of the electronic device to a desired viewing angle and tightening the knob 226 tightens the first side 210, the second side 220, and the third side 230 to maintain the viewing angle.

The third side 230 extends from the first side 210 toward the wall bracket 400 and is perpendicular to the first side 210 and parallel to the second side 220. In some embodiments, the third side 230 is provided as a mirror image of the second side 220 and includes similar features. For example, the third side 230 includes a second set of attachment screw holes 231 to receive a screw, such as the one of the screws 350. An interior face 232, not visible in FIG. 1 but shown in FIG. 3, of the third side 230 includes a second set of threaded fasteners 234, not visible in FIG. 1 but shown in FIG. 3.

Each of the intermediate brackets 200 includes a pair of connection screws 250 inserted from the second side 220 that connects the mounting mechanism 205 to the connection mechanism 240. Together, the mounting mechanism 205 and the connection mechanism comprise one intermediate bracket 200.

As described herein, the knob 226 is located on the second side 220 of the intermediate bracket 200. However, other embodiments are possible. For example, the knob 226 can be located on the third side 230 without departing from the scope of the present disclosure. For example, the knob 226 can be located on the third side 230 of the intermediate bracket 200. In some embodiments, the intermediate bracket 200 can include the knob 226 on both the second side 220 and the third side 230. In some embodiments, the knob 226 can be located elsewhere on the modular mounting apparatus 100, such as on the connection mechanism 240 or the rail 300. In some embodiments, a knob 226 is located on the second side 220 of the first intermediate bracket 200a and a knob is located on the third side 230 of the intermediate bracket 200b. In these embodiments, the knob 226 is located on an exterior side of each intermediate bracket 200 such that each intermediate bracket 200 is accessible for adjustment when the electronic device 810 is mounted.

The connection mechanism 240 includes a hook 242, a latch 244, and a cord 246. The connection mechanism 240 connects the intermediate bracket 200 to the wall bracket 400. The hook 242 is inserted into a groove in a top of the wall bracket 400 and the latch 244 is inserted into a groove in a bottom of the wall bracket 400. The cord 246 controls the position of the latch 244. The connection between the connection mechanism 240 and the wall bracket 400 will be described in greater detail below with reference to the wall bracket 400.

The modular mounting apparatus 100 further includes at least one rail, such as the two rails 300a and 300b and further illustrated in FIGS. 2-7 as a rail 300. Each rail 300 is configured to be removably coupled to the intermediate bracket 200. In some embodiments, the intermediate bracket 200 is nested within the rail 300 when the rail 300 is removably coupled to the intermediate bracket 200. Accordingly, the rail 300 includes a front segment 310, a first side segment 320, and a second side segment 330 that correspond to the first side 210, the second side 220, and the third side 230 of the intermediate bracket 200, respectively. In some embodiments, a length of the rail 300 is greater than a length of the intermediate bracket 200.

The front segment 310 corresponds to the first side 210 of the intermediate bracket 200 and includes a second plurality of mounting screw holes 312a-312n. Each individual mounting screw hole 312 is configured to receive a screw that, after passing through the mounting screw hole 312, is threaded into a first fastener on the electronic device. The front segment 310 further includes at least one elongated mounting screw opening 314. The at least one elongated mounting screw opening 314 is configured to receive a screw that, after passing through the elongated mounting screw opening 314, is threaded into a second fastener on the electronic device. The combination of the second plurality of mounting screw holes 312a-312n and the at least one elongated mounting screw opening 314 enables the rail 300 to mount to a range of electronic devices with varying configurations of fastener patterns. By applying the at least one elongated mounting screw opening 314 on a portion of the front segment 310, the first fastener and the second fastener on the electronic device do not have to line up perfectly with any two mounting screw holes 312 of the rail 300. Instead, the first fastener is lined up with one of the mounting screw holes 312 and the second fastener can be lined up with any portion of an opening of the elongated mounting screw opening 314.

The first side segment 320 corresponds to the second side 220 of the intermediate bracket 200. The first side segment 320 includes a first set of attachment screw holes 322 that correspond to the first set of threaded fasteners 224 on the interior face 222 of the second side 220. In embodiments where the rail 300 is removably coupled to the intermediate bracket 200, a first set of screws 340 are inserted through the first set of attachment screw holes 322 and threaded into the first set of threaded fasteners 224. In some embodiments, the first set of attachment screw holes 322 includes two attachment screw holes 322 that correspond to two threaded fasteners 224. In these embodiments, two screws 340 are used to couple the first side segment 320 to the second side 220, with one screw 340 used for each attachment screw hole 322 and corresponding threaded fastener 224. However, these embodiments should not be construed as limiting. Any suitable number of attachment screw holes 322, threaded fasteners 224, and screws 340 can be used to suitably couple the first side segment 320 to the second side 220. In various embodiments, one attachment screw hole 322, threaded fastener 224, and screw 340 can be used or three or more attachment screw holes 322, threaded fasteners 224, and screws 340 can be used. The first side segment 320 further includes a notch 324. The notch 324 prevents the first side segment 320 from interfering with the knob 226 in embodiments where the knob 226 is located on the second side 220 of the intermediate bracket 200.

The second side segment 330 corresponds to the third side 230 of the intermediate bracket 200. In some embodiments, the second side segment 330 is provided as a mirror image of the first side segment 320 and includes similar features. For example, the second side segment 330 includes a second set of attachment screw holes 332 that correspond to the second set of threaded fasteners 234 on the interior face 232 of the third side 230. In embodiments where the rail 300 is removably coupled to the intermediate bracket 200, a second set of screws 350 are inserted through the second set of attachment screw holes 332 and threaded into the second set of threaded fasteners 234. In some embodiments, the second set of attachment screw holes 332 includes two attachment screw holes 332 that correspond to two threaded fasteners 234. In these embodiments, two screws 350 are used to couple the second side segment 330 to the third side 230, with one screw 350 used for each attachment screw hole 332 and corresponding threaded fastener 234. However, these embodiments should not be construed as limiting. Any suitable number of attachment screw holes 332, threaded fasteners 234, and screws 350 can be used to suitably couple the second side segment 330 to the third side 230. In various embodiments, one attachment screw hole 332, threaded fastener 234, and screw 350 can be used or three or more attachment screw holes 332, threaded fasteners 234, and screws 350 can be used. The second side segment 330 further includes a notch 334. The notch 334 prevents the second side segment 330 from interfering with the knob 226 in embodiments where the knob 226 is located on the third side 230 of the intermediate bracket 200.

The modular mounting apparatus 100 further includes a wall bracket 400. The wall bracket 400 includes a first row of through holes 405 and a second row of through holes 410. The first row of through holes 405 and the second row of through holes 410 allow the wall bracket 400 to be affixed to a structure, such as a wall, a door, a stud, or any other structure suitable for mounting an electronic device. In embodiments where the structure is a wall, the first row of through holes 405 and the second row of through holes 410 provide a consumer with options for affixing the wall bracket 400 to the wall. Consumers determine a mounting location for an electronic device based of criteria specific to the individual consumer and providing rows of through holes allow the consumer to make an individual decision on mounting the electronic device. For example, the first row of through holes 405 and the second row of through holes 410 provide the consumer the opportunity to affix the wall bracket 400 to the wall by applying two mounting devices, such as screws, in the first row of through holes 405 and by applying two mounting devices, such as screws, in the second row of through holes 410. In some embodiments, a consumer desires to place mounting devices, such as screws, only in a stud within the wall. By providing the first row of through holes 405 and the second row of through holes 410, the consumer has a selection of through holes to select from in order to affix the wall bracket 400 to the wall, depending on the location of the studs, while still allowing the consumer to move the wall bracket 400, such as to center the wall bracket 400 on the wall.

The wall bracket 400 further includes a first groove 415 and a second groove 420. The first groove 415 is provided on a first edge 425 of the wall bracket 400 and configured to receive the hook 242 of the intermediate bracket 200. In some embodiments, the first edge 425 defines a top edge of the wall bracket 400. For example, the wall bracket 400 can include at least one arrow 440 that indicates to the consumer the intended alignment of the wall bracket 400 when affixed to a wall. In these embodiments, the at least one arrow 440 indicates the first edge 425 as the top edge. However, other embodiments are possible. Depending on the perspective from which the wall bracket 400 is viewed, the first edge 425 can be identified as a bottom edge or side edge of the wall bracket 400.

The second groove 420 is provided on a second edge 430 of the wall bracket 400 and is configured to receive the latch 244 of the intermediate bracket 200. In some embodiments, the second edge 430 defines a bottom edge of the wall bracket 400 opposite the first edge 425. For example, the at least one arrow 440 can point away from the second edge 430 and toward the first edge 425. However, other embodiments are possible. Depending on the perspective from which the wall bracket 400 is viewed, the second edge 430 can be identified as a top edge or side edge of the wall bracket 400.

The first groove 415 and the second groove 420 enable the connection mechanism 240 to affix to the wall bracket 400. After the wall bracket 400 is affixed to the structure, such as a wall, the first groove 415 and the second groove 420 enable portions of the wall bracket 400 to be spaced apart from the structure at a distance at least greater than the width of the hook 242 and the latch 244. A first portion 242a of the hook 242 extends on a horizontal plane toward the structure and a second portion 242b of the hook 242 extends on a vertical plane toward the wall bracket 400 into the first groove 415. Likewise, an extending portion 243 of the connection mechanism 240 extends on a horizontal plane toward the structure and the latch 244 extends on a vertical plane toward the wall bracket 400 into the second groove 420.

The latch 244 is manipulated by the cord 246. For example, the cord 246 is manipulated by the consumer by pulling on the cord in a vertical direction away from the connection mechanism 240. For example, when viewed from the perspective shown in FIG. 1, the cord 246 is pulled down in a direction opposite from the direction the at least one arrow 440 is pointed. When the cord is at rest, and not manipulated, i.e., pulled down, the latch 244 is at rest in the closed position as shown in FIG. 1. When the latch 244 is in the closed position, the latch 244 extends on the vertical plane toward the wall bracket 400 into the second groove 420. When the cord 246 is manipulated, i.e., pulled down, the latch 244 is retracted behind the extending portion 243. When the latch 244 is retracted, the latch 244 does not extend in the vertical direction.

The cord 246 is manipulated to extend or retract the latch 244 based on the consumer's desired function. For example, the cord 246 is manipulated to retract the latch 244 from its resting, extended position to mount the connection mechanism 240 onto the wall bracket 400. In this example, the hook 242 is hooked over a top of the wall bracket 400 and inserted into the first groove 415, the cord 246 is manipulated to retract the latch 244, the extending portion 243 is positioned proximate to the second groove 420, and the cord 246 is released, or pulled, returning the latch 244 to its resting position which is now clamped to a bottom of the wall bracket 400 and inserted within the second groove 420 due to the positioning of the extending portion 243. Similarly, the cord 236 is manipulated to retract the latch 244 from its resting, extended position to remove the connection mechanism 240 from the wall bracket 400. In this example, the cord 246 is manipulated to retract the latch 244, the extending portion 243 is removed from its position proximate to the second groove 420, the hook 242 is removed from the first groove 415, and the connection mechanism 240 is removed from the wall bracket 400. In this example, the cord can be released, returning the latch 244 to its resting, extended state, any time after the extending portion 243 is removed from its position proximate to the second groove 420.

In some embodiments, the wall bracket 400 includes a level 445. The level can be affixed to the wall bracket 400, embedded within the wall bracket 400, or otherwise attached to the wall bracket 400 in a manner that the level 445 can be viewed by the consumer when the wall bracket 400 is affixed to the structure. The level 445 is an optical device that displays the relative angle of the surface it is affixed upon. The level 445 is provided to be used by the consumer so that the wall bracket 400 is mounted on the structure parallel to a horizontal plane.

As shown in FIG. 1, the modular mounting apparatus 100 includes two intermediate brackets 200, two rails 300, and one wall bracket 400. However, various embodiments are possible. Some embodiments of the modular mounting apparatus 100 include more than two intermediate brackets 200 and/or more than three rails 300. Some embodiments, as described in greater detail below, include one wall bracket 400 and two intermediate brackets 200 affixed to an electronic device without the use of the rails 300.

Figure 2:
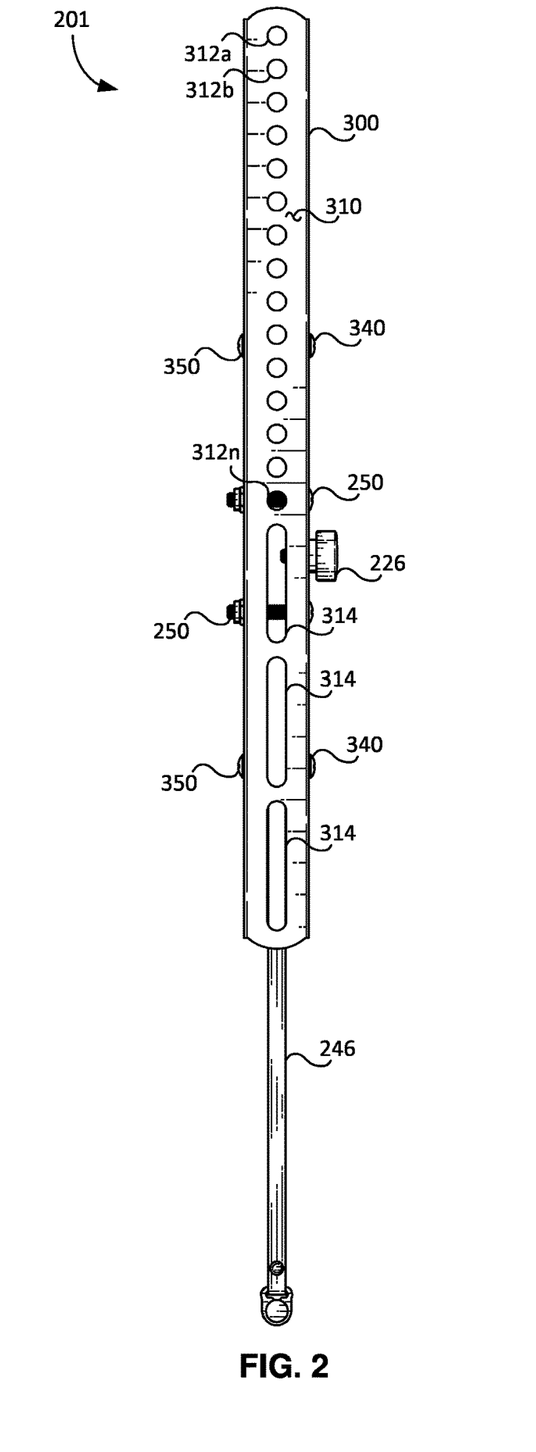
FIG. 2 illustrates a front view of a modular mounting apparatus according to various embodiments of the present disclosure.

FIG. 2 illustrates a front view of the modular mounting apparatus 100 according to various embodiments of the present disclosure. In particular, FIG. 2 illustrates a front view 201 of the intermediate bracket 200 nested inside the rail 300 according to various embodiments of the present disclosure. The front view 201 illustrated in FIG. 2 is for illustration only. Other examples of the front view 201 can be used without departing from the scope of the present disclosure.

The front view 201 illustrates the front segment 310 of the rail 300 including the second plurality of mounting screw holes 312a-312n and three elongated mounting screw openings 314a, 314b, and 314c. Also shown in FIG. 2 is the knob 226 of the intermediate bracket 200, two connection screws 250, and the cord 246.

Figure 3:
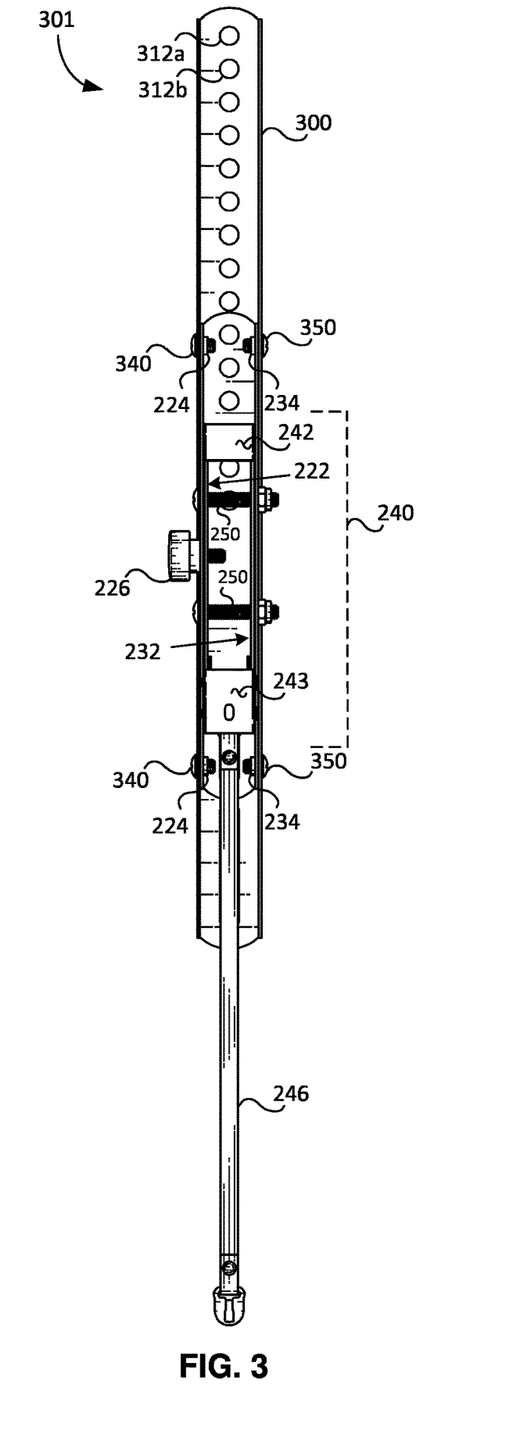
FIG. 3 illustrates a rear view of a modular mounting apparatus according to various embodiments of the present disclosure.

FIG. 3 illustrates a rear view of the modular mounting apparatus 100 according to various embodiments of the present disclosure. In particular, FIG. 3 illustrates a rear view 301 of the intermediate bracket 200 nested inside the rail 300 according to various embodiments of the present disclosure. The rear view 301 illustrated in FIG. 3 is for illustration only. Other examples of the rear view 301 can be used without departing from the scope of the present disclosure.

The rear view 301 illustrates a rear portion of the intermediate bracket 200 including the first set of threaded fasteners 224 on the interior face 222, the second set of threaded fasteners 234 on the interior face 232, the knob 226, two connection screws 250, and the cord 246. The rear view 301 further illustrates the plurality of screws 340 threaded through the attachment screw holes 322 and the first set of threaded fasteners 224 and the plurality of screws 350 threaded through the attachment screw holes 332 and the second set of threaded fasteners 234.

The first set of threaded fasteners 224 on the interior face 222 and the second set of threaded fasteners 234 on the interior face 232 provide a mechanism for attaching the rail 300 to the intermediate bracket 200 and increasing the strength of the modular mounting apparatus 100. Providing the first set of threaded fasteners 224 on the interior face 222 and the second set of threaded fasteners 234 on the interior face 232 allows the intermediate bracket 200 to be nested within the rail 300. In contrast, providing the first set of threaded fasteners 224 on the second side 220 and the second set of threaded fasteners 234 on the third side 230 would require a gap to be present between the intermediate bracket 200 and the rail 300 when the intermediate bracket 200 is nested within the rail. In addition, this would require increasing the width of the front segment 310 of the rail 300 to accommodate the extra width of the first set of threaded fasteners 224 on the second side 220 and the second set of threaded fasteners 234 on the third side 230. The gap, if present, would reduce the strength of the modular mounting apparatus 100 when mounting an electronic device using the modular mounting apparatus 100. Accordingly, the placement of the first set of threaded fasteners 224 on the interior face 222 and the second set of threaded fasteners 234 on the interior face 232 increases the overall strength of the modular mounting apparatus 100 without increasing the size of the rail 300.

Figure 4:
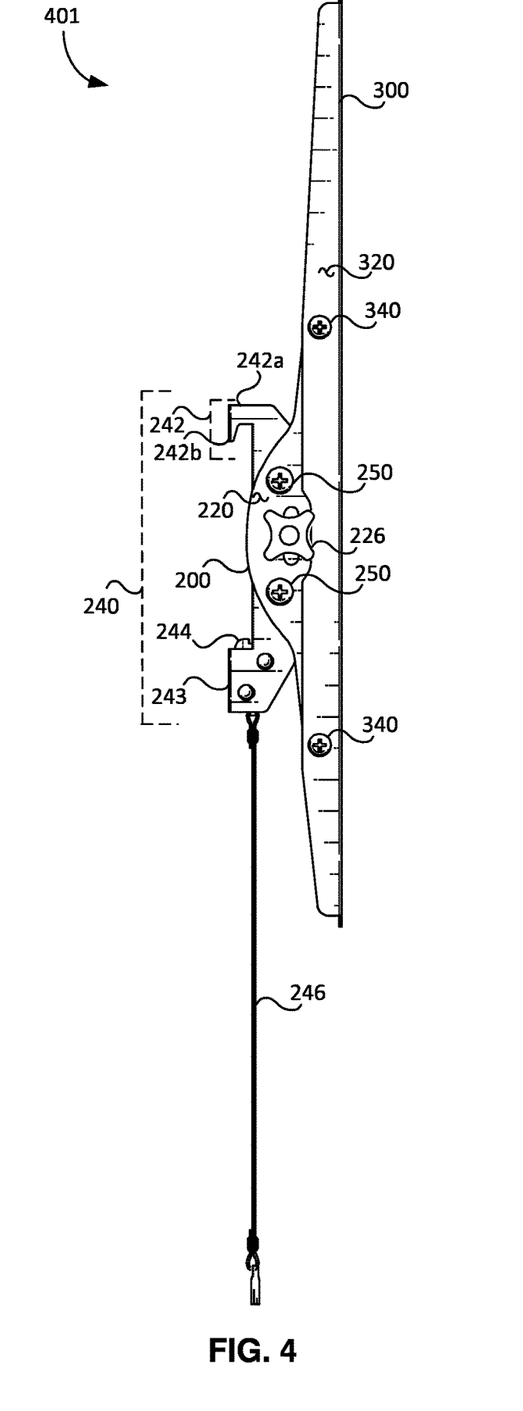
FIG. 4 illustrates a first side view of a modular mounting apparatus according to various embodiments of the present disclosure.

FIG. 4 illustrates a first side view of the modular mounting apparatus 100 according to various embodiments of the present disclosure. In particular, FIG. 4 illustrates a first side view 401 of the intermediate bracket 200 nested inside the rail 300 according to various embodiments of the present disclosure. The first side view 401 illustrated in FIG. 4 is for illustration only. Other examples of the first side view 401 can be used without departing from the scope of the present disclosure.

In particular, the first side view 401 illustrates the second side 220 of the intermediate bracket 200 and the first side segment 320 of the rail 300. As shown in the first side view 401, two screws 340 couple the rail 300 to the intermediate bracket 200. The first side view 401 further illustrates the knob 226 and the cord 246.

Figure 5:
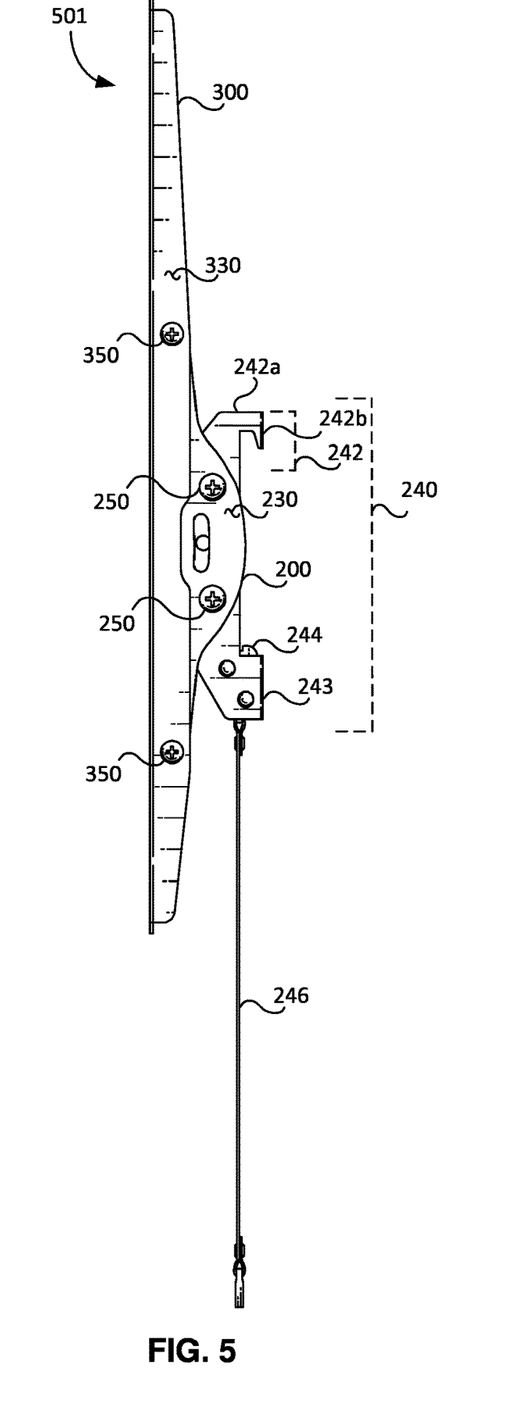
FIG. 5 illustrates a second side view of a modular mounting apparatus according to various embodiments of the present disclosure.

FIG. 5 illustrates a second side view of the modular mounting apparatus 100 according to various embodiments of the present disclosure. In particular, FIG. 5 illustrates a second side view 501 of the intermediate bracket 200 nested inside the rail 300 according to various embodiments of the present disclosure. The second side view 501 illustrated in FIG. 5 is for illustration only. Other examples of the second side view 501 can be used without departing from the scope of the present disclosure.

In particular, the second side view 501 illustrates the third side 230 of the intermediate bracket 200 and the second side segment 330 of the rail 300. As shown in the second side view 501, two screws 350 couple the rail 300 to the intermediate bracket 200. The second side view 501 further illustrates the cord 246.

Figure 6:
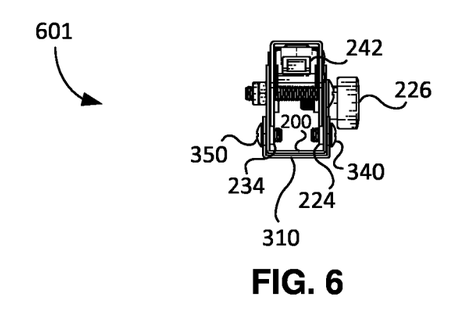
FIG. 6 illustrates a top view of a modular mounting apparatus according to various embodiments of the present disclosure.

FIG. 6 illustrates a top view of the modular mounting apparatus 100 according to various embodiments of the present disclosure. In particular, FIG. 6 illustrates a top view 601 of the intermediate bracket 200 nested inside the rail 300 according to various embodiments of the present disclosure. The top view 601 illustrated in FIG. 6 is for illustration only. Other examples of the top view 601 can be used without departing from the scope of the present disclosure.

In particular, the top view 601 identifies the front segment 310 of the rail 300 and the intermediate bracket 200 nested proximate to the front segment 310. The top view 601 further identifies the screws 340, screws 350, first set of threaded fasteners 224, second set of threaded fasteners 234, the hook 242, and the knob 226.

Figure 7:
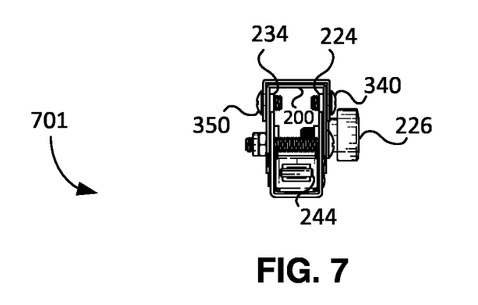
FIG. 7 illustrates a bottom view of a modular mounting apparatus according to various embodiments of the present disclosure.

FIG. 7 illustrates a bottom view of the modular mounting apparatus 100 according to various embodiments of the present disclosure. In particular, FIG. 7 illustrates a bottom view 701 of the intermediate bracket 200 nested inside the rail 300 according to various embodiments of the present disclosure. The bottom view 701 illustrated in FIG. 7 is for illustration only. Other examples of the bottom view 701 can be used without departing from the scope of the present disclosure.

In particular, the bottom view 701 identifies the front segment 310 of the rail 300 and the intermediate bracket 200 nested proximate to the front segment 310. The bottom view 701 further identifies the screws 340, screws 350, first set of threaded fasteners 224, second set of threaded fasteners 234, the latch 244, and the knob 226.

Figure 8:
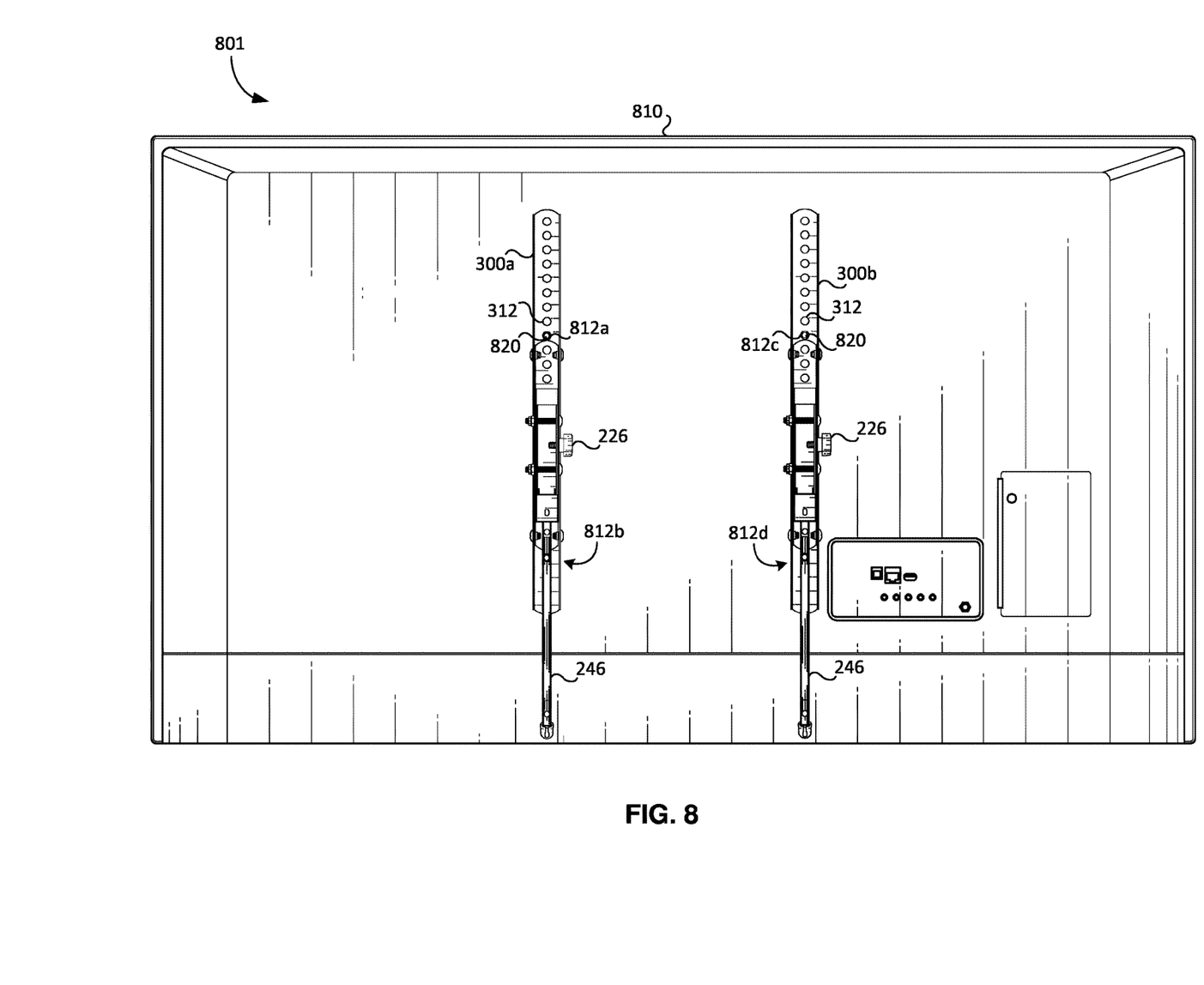
FIG. 8 illustrates an electronic device mounted to a modular mounting apparatus according to various embodiments of the present disclosure.

FIG. 8 illustrates an electronic device mounted to a modular mounting apparatus 100 according to various embodiments of the present disclosure. In particular, FIG. 8 illustrates a rear view 801 of the electronic device 810 mounted to a pair of the rails 300 according to various embodiments of the present disclosure. The rear view 801 illustrated in FIG. 8 is for illustration only. Other examples of the rear view 801 can be used without departing from the scope of the present disclosure.

The rear view 801 illustrates two rails 300 as described herein. Each of the rails 300 are the rail 300 illustrated in FIG. 1. When the electronic device 810 is mounted on a structure, such as a wall, via the modular mounting apparatus 100, the rails are affixed to the intermediate bracket 200, the intermediate bracket 200 is affixed to the wall bracket 400 (not shown), and the wall bracket 400 (not shown) is affixed to the wall. Accordingly, the modular mounting apparatus 100 affixes the electronic device 810 to the wall. In FIG. 8, for ease of illustration and explanation, the wall bracket 400 is omitted to more clearly illustrate the attachment of the rails 300 to the electronic device 810.

The electronic device 810 can be a television, a computer monitor, or any other electronic device suitable for mounting on a structure, such as a wall. The electronic device 810 includes a plurality of fasteners 812. For example, as shown in FIG. 8, the electronic device 810 includes four fasteners 812a, 812b, 812c, and 812d. The fastener 812a is configured to align with one of the mounting screw holes 312 of the first rail 300a and the fastener 812b, provided behind the cord 246 in FIG. 8, is configured to align with the elongated mounting screw opening 314 of the first rail 300a. The fastener 812c is configured to align with one of the mounting screw holes 312 of the second rail 300b and the fastener 812d, provided behind the cord 246 in FIG. 8, is configured to align with the elongated mounting screw opening 314 of the second rail 300b. Based on the alignment of each fastener 812 to the rail 300, a separate mounting screw 820 is inserted into each fastener 812 to removably couple the electronic device 810 to the rail 300 of the modular mounting apparatus 100. For example, a mounting screw 820 is threaded through one of the mounting screw holes 312 of the first rail 300a and into the fastener 812a, a mounting screw 820 is threaded through one of the mounting screw holes 312 of the second rail 300b and into the fastener 812c, a mounting screw 820 is threaded through the elongated mounting screw opening 314 of the first rail 300a and into the fastener 812b, and a mounting screw 820 is threaded through the elongated mounting screw opening 314 of the second rail 300b and into the fastener 812d.

As described herein, various embodiments of the present disclosure provide a modular mounting solution for electronic devices such as the electronic device 810. In embodiments where the electronic device 810 is of a larger size, the electronic device 810 can be mounted using the modular mounting apparatus 100 including the wall bracket 400, the intermediate brackets 200, and the rails 300. In other embodiments, where the electronic device 810 is of a smaller size, the electronic device 810 can be mounted using the wall bracket 400 and the intermediate brackets 200, while omitting the rails 300. For example, the consumer can prefer to omit the rails 300 due to the extended size of the rails 300, which could be seen by the consumer behind the electronic device 810 when viewing the mounted electronic device 810. Due to the smaller size of the electronic device 810, the reduced strength of the modular mounting apparatus 100 does not pose a problem. In embodiments where the electronic device 810 is of an increased size, the use of the rails 300 mounted to the intermediate bracket 200 increases the strength of the modular mounting apparatus 100 in order to sufficiently mount the electronic device 810 to a structure, such as the wall.

As discussed above, in embodiments where the electronic device 810 is of a relatively smaller size, the electronic device 810 can mount directly to two of the intermediate brackets 200 and rails 300 are omitted. In these embodiments, the fastener 812a is configured to align with one of the mounting screw holes 212 of the first intermediate bracket 200a and the fastener 812b is configured to align with the elongated mounting screw opening 214 of the first intermediate bracket 200a. The fastener 812c is configured to align with one of the mounting screw holes 212 of the second intermediate bracket 200b and the fastener 812d is configured to align with the elongated mounting screw opening 214 of the second intermediate bracket 200b.

Various embodiments of the present disclosure provide mounting advantages for the consumer as well as advantages for the retailer of the modular mounting apparatus 100. For example, the modular mounting apparatus 100 provides the consumer with a modular mounting solution capable of mounting a wide range of electronic devices to a structure, such as a wall, with increased strength when mounting larger electronic devices, while remaining aesthetically pleasing and not visible behind the electronic device regardless of the size of the electronic device. In particular, for a larger electronic device, the intermediate bracket 200 nested inside the rail 300 increases the strength of the modular mounting apparatus 100 to sufficiently support the larger electronic device. For a smaller electronic device, the rail 300 can be removed so as to not show the modular mounting apparatus 100 behind the electronic device and the electronic device is mounted to the intermediate bracket 200, which provides sufficient strength to mount the electronic device of a smaller size. As such, the modular mounting apparatus 100 is applicable to a larger range of sizes of electronic devices, potentially saving the consumer from purchasing a new mounting bracket when a larger or smaller electronic device is purchased. These advantages benefit the retailer as well. The modular mounting apparatus 100 enables the retailer to potentially sell the modular mounting apparatus 100 as a single product rather than separate smaller and larger mounting brackets. As such, because the modular mounting apparatus 100 fits an increased range of sizes of electronic devices, the retailer is enabled to provide a more efficient quantity of suitable items for sale, saving shelf space without sacrificing a number of suitable products for the consumer. Accordingly, the customer buying experience is improved leading to a greater likelihood the purchased product is suitable, fewer returns of the purchased product, and fewer negative reviews of the purchased product and the retailer.

Figure 9:
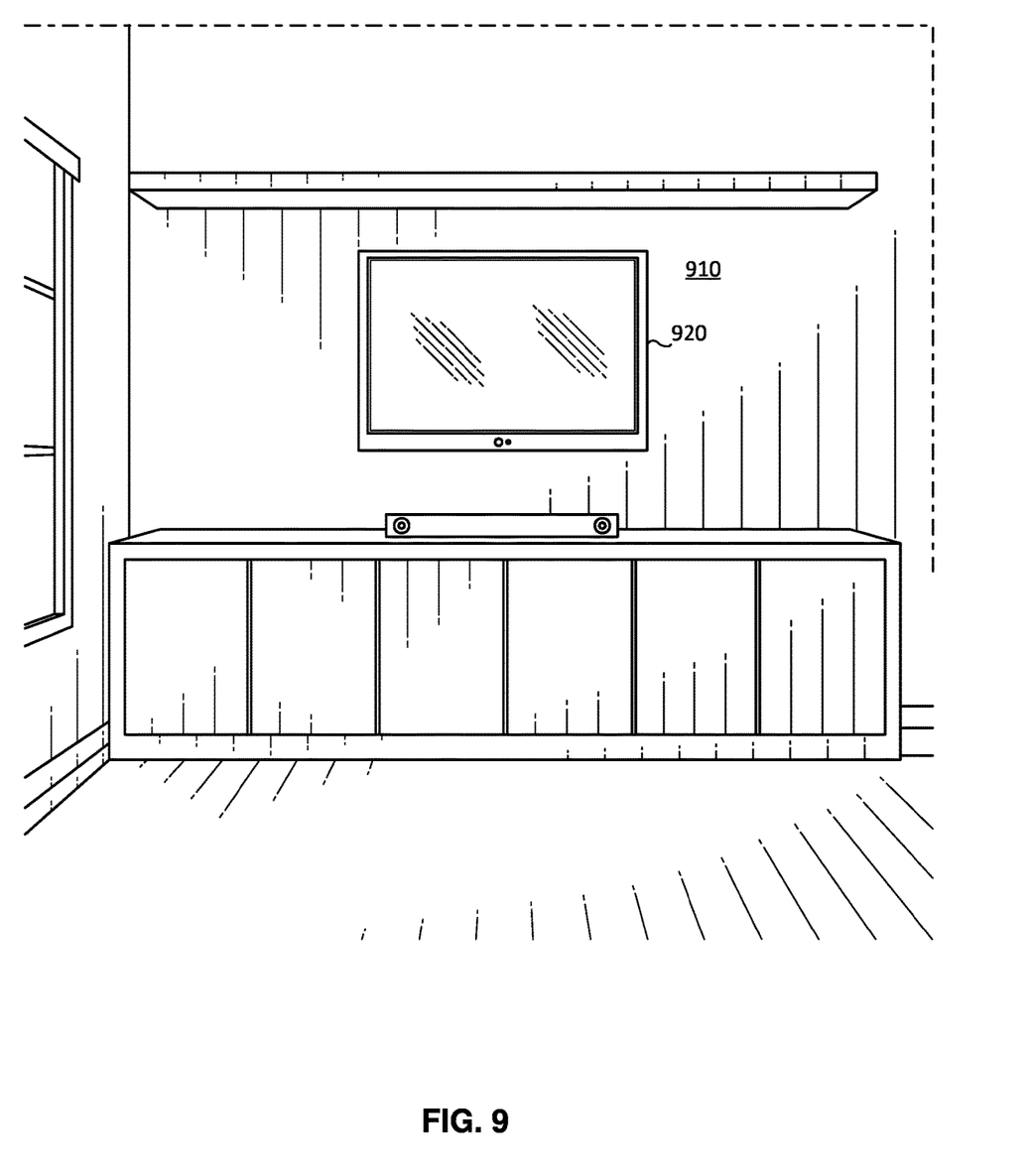
FIG. 9 illustrates an electronic device mounted on a structure via the modular mounting apparatus according to various embodiments of the present disclosure.

FIG. 9 illustrates an electronic device mounted on a structure via the modular mounting apparatus 100 according to various embodiments of the present disclosure. The mounted electronic device illustrated in FIG. 9 is for illustration only. Other examples of the mounted electronic device can be used without departing from the scope of the present disclosure.

FIG. 9 illustrates a structure 910. In some embodiments, the structure 910 is a wall. In some embodiments, the structure 910 is a door, a frame, or any other suitable structure for mounting an electronic device, such as the electronic device 810. FIG. 9 further illustrates a mounted electronic device 920. The mounted electronic device 920 can be the electronic device 810. In some embodiments, the mounted electronic device 920 is a television. In some embodiments, the mounted electronic device 920 is a computer monitor or any other electronic device suitable for mounting on the structure 910. The mounted electronic device 920 is mounted to the structure 910 via the modular mounting apparatus 100 described herein and includes the advantages of the modular mounting apparatus 100. For example, the modular mounting apparatus 100 is not visible when viewing the mounted electronic device 920 on the structure 910. The modular mounting apparatus 100 provides sufficient strength and support for the mounted electronic device 920 on the structure 910.

Alternatively, or in addition to the other examples described herein, examples include any combination of the following:

a wall bracket configured to be affixed to a structure;
a first intermediate bracket and a second intermediate bracket, wherein each intermediate bracket of the first intermediate bracket and the second intermediate bracket are configured to be affixed to the wall bracket and each intermediate bracket of the first intermediate bracket and the second intermediate bracket includes:
a connection mechanism configured to affix the each intermediate bracket to the wall bracket,
a first side oriented parallel to the wall bracket, the first side comprising a first plurality of mounting screw holes,
a second side oriented perpendicular to the first side and extending from the first side toward the wall bracket, the second side comprising a first set of threaded fasteners, and
a third side oriented perpendicular to the first side, parallel to the second side, and extending from the first side toward the wall bracket, the third side comprising a second set of threaded fasteners; and
a first rail and a second rail, wherein the first rail is removably coupled to the first intermediate bracket and the second rail is removably coupled to the second intermediate bracket, and wherein each rail of the first rail and the second rail includes:
a front segment corresponding to the first side of a corresponding intermediate bracket, the front segment comprising a second plurality of mounting screw holes,
a first side segment corresponding to the second side of the corresponding intermediate bracket, the first side segment comprising a first set of attachment screw holes corresponding to the first set of threaded fasteners on the second side of the corresponding intermediate bracket, and
a second side segment corresponding to the third side of the corresponding intermediate bracket and parallel to the first side segment, the second side segment comprising a second set of attachment screw holes corresponding to the second set of threaded fasteners on the third side of the corresponding intermediate bracket;
a first set of screws inserted through the first set of attachment screw holes and threaded into the first set of threaded fasteners; and
a second set of screws inserted through the second set of attachment screw holes and threaded into the second set of threaded fasteners,
wherein the first set of screws and the second set of screws removably couple the first rail to the first intermediate bracket and the second rail to the second intermediate bracket;
wherein a length of the front segment of each rail is greater than a length of the first side of each intermediate bracket;
wherein an electronic device is removably coupled to the mounting apparatus via the second plurality of mounting screw holes;
a set of mounting screws, wherein each mounting screw of the set of mounting screws is configured to be threaded through one of the first plurality of mounting screw holes and one of the second plurality of mounting screw holes and threaded into a fastener of the electronic device to removably couple the electronic device to the mounting apparatus;
wherein the electronic device is a television or a computer monitor;
wherein the connection mechanism of each of the first intermediate bracket and the second intermediate bracket comprises:
a hook configured to hook over a top of the wall bracket, and
a latch configured to clamp to a bottom of the wall bracket;
wherein the connection mechanism of each of the first intermediate bracket and the second intermediate bracket further comprises a cord that, when pulled in a direction away from a corresponding intermediate bracket, releases the latch to remove the corresponding intermediate bracket from the wall bracket;
wherein the wall bracket includes a first groove configured to receive the hook of each intermediate bracket and a second groove configured to receive the latch of each intermediate bracket;
wherein each of the first intermediate bracket and the second intermediate bracket further comprises a knob configured to, when partially tightened, allow the corresponding rail to pivot on an axis and, when fully tightened, prevent the corresponding rail from pivoting on the axis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A mounting apparatus, comprising:
    a wall bracket configured to be affixed to a structure;
    a first intermediate bracket and a second intermediate bracket, wherein each intermediate bracket of the first intermediate bracket and the second intermediate bracket are configured to be affixed to the wall bracket and each intermediate bracket of the first intermediate bracket and the second intermediate bracket includes:
        a connection mechanism configured to affix the each intermediate bracket to the wall bracket,
        a first side oriented parallel to the wall bracket, the first side comprising a first plurality of mounting screw holes,
        a second side oriented perpendicular to the first side and extending from the first side toward the wall bracket, the second side comprising a first set of threaded fasteners, and
        a third side oriented perpendicular to the first side, parallel to the second side, and extending from the first side toward the wall bracket, the third side comprising a second set of threaded fasteners; and
    a first rail and a second rail, wherein the first rail is removably coupled to the first intermediate bracket such that the first intermediate bracket is configured to be nested within the first rail and the second rail is removably coupled to the second intermediate bracket such that the second intermediate bracket is configured to be nested within the second rail, and wherein each rail of the first rail and the second rail includes:
        a front segment corresponding to the first side of a corresponding intermediate bracket, the front segment comprising a second plurality of mounting screw holes that align with the first plurality of mounting screw holes when each of the intermediate brackets is nested within each of the corresponding rails such that the first side of each of the intermediate brackets is entirely covered by the front segment of each of the corresponding rails,
        a first side segment corresponding to the second side of the corresponding intermediate bracket, the first side segment comprising a first set of attachment screw holes corresponding to the first set of threaded fasteners on the second side of the corresponding intermediate bracket, and
        a second side segment corresponding to the third side of the corresponding intermediate bracket and parallel to the first side segment, the second side segment comprising a second set of attachment screw holes corresponding to the second set of threaded fasteners on the third side of the corresponding intermediate bracket.

2. The mounting apparatus of claim 1, further comprising:
    a first set of screws inserted through the first set of attachment screw holes and threaded into the first set of threaded fasteners; and
    a second set of screws inserted through the second set of attachment screw holes and threaded into the second set of threaded fasteners,
    wherein the first set of screws and the second set of screws removably couple the first rail to the first intermediate bracket and the second rail to the second intermediate bracket.

3. The mounting apparatus of claim 1, wherein a length of the front segment of each rail is greater than a length of the first side of each intermediate bracket.

4. The mounting apparatus of claim 1, wherein an electronic device is removably coupled to the mounting apparatus via the second plurality of mounting screw holes.

5. The mounting apparatus of claim 4, further comprising a set of mounting screws, wherein each mounting screw of the set of mounting screws is configured to be threaded through one of the first plurality of mounting screw holes and one of the second plurality of mounting screw holes and threaded into a fastener of the electronic device to removably couple the electronic device to the mounting apparatus.

6. The mounting apparatus of claim 4, wherein the electronic device is a television or a computer monitor.

7. The mounting apparatus of claim 1, wherein the connection mechanism of each of the first intermediate bracket and the second intermediate bracket comprises:
   a hook configured to hook over a top of the wall bracket, and
   a latch configured to clamp to a bottom of the wall bracket.

8. The mounting apparatus of claim 7, wherein the connection mechanism of each of the first intermediate bracket and the second intermediate bracket further comprises a cord that, when pulled in a direction away from a corresponding intermediate bracket, releases the latch to remove the corresponding intermediate bracket from the wall bracket.

9. The mounting apparatus of claim 7, wherein the wall bracket includes a first groove configured to receive the hook of each intermediate bracket and a second groove configured to receive the latch of each intermediate bracket.

10. The mounting apparatus of claim 1, wherein each of the first intermediate bracket and the second intermediate bracket further comprises a knob configured to, when partially tightened, allow the corresponding rail to pivot on an axis and, when fully tightened, prevent the corresponding rail from pivoting on the axis.

11. A mounting apparatus, comprising:
   a wall bracket configured to be affixed to a structure;
   an intermediate bracket configured to be affixed to the wall bracket, the intermediate bracket further comprising:
      a connection mechanism configured to affix the intermediate bracket to the wall bracket,
      a first side oriented parallel to the wall bracket, the first side comprising a plurality of mounting screw holes,
      a second side oriented perpendicular to the first side and extending from the first side toward the wall bracket, the second side comprising a first set of threaded fasteners, and
      a third side oriented perpendicular to the first side, parallel to the second side, and extending from the first side toward the wall bracket, the third side comprising a second set of threaded fasteners; and
   a rail configured to be removably coupled to the intermediate bracket such that the intermediate bracket is nested within the rail and the first side of the intermediate bracket is entirely covered by a front segment of the rail, the rail further comprising:
      the front segment having another plurality of mounting screw holes that align with the plurality of mounting screw holes of the intermediate bracket when the intermediate bracket is nested within the rail.

12. The mounting apparatus of claim 11, wherein an electronic device is removably coupled to the mounting apparatus via the plurality of mounting screw holes.

13. The mounting apparatus of claim 12, further comprising a set of mounting screws, wherein, to removably couple the electronic device to the mounting apparatus, each mounting screw of the set of mounting screws is threaded through one of the plurality of mounting screw holes and threaded into a fastener of the electronic device.

14. The mounting apparatus of claim 11, wherein the rail further includes:
   a first side segment corresponding to the second side of the intermediate bracket, the first side segment comprising a first set of attachment screw holes corresponding to the first set of threaded fasteners on the second side of the intermediate bracket, and
   a second side segment corresponding to the third side of the intermediate bracket and parallel to the first side segment, the second side segment comprising a second set of attachment screw holes corresponding to the second set of threaded fasteners on the third side of the intermediate bracket.

15. The mounting apparatus of claim 14, further comprising:
   a first set of screws inserted through the first set of attachment screw holes and threaded into the first set of threaded fasteners; and
   a second set of screws inserted through the second set of attachment screw holes and threaded into the second set of threaded fasteners,
   wherein the first set of screws and the second set of screws removably couple the rail to the intermediate bracket.

16. The mounting apparatus of claim 11, wherein the connection mechanism of the intermediate bracket further comprises:
   a hook configured to hook over a top of the wall bracket, and
   a latch configured to clamp to a bottom of the wall bracket.

17. The mounting apparatus of claim 16, wherein the connection mechanism of the intermediate bracket further comprises:
   a cord that, when pulled in a direction away from the intermediate bracket, releases the latch to remove the intermediate bracket from the wall bracket.

18. The mounting apparatus of claim 16, wherein the wall bracket includes a first groove configured to receive the hook of the intermediate bracket and a second groove configured to receive the latch of the intermediate bracket.

19. The mounting apparatus of claim 11, wherein the intermediate bracket further comprises:
   a knob configured to, when partially tightened, allow the first side, the second side, and the third side to pivot on an axis and, when fully tightened, prevent the first side, the second side, and the third side from pivoting on the axis.

* * * * *